(12) United States Patent
Talwar et al.

(10) Patent No.: US 8,799,903 B1
(45) Date of Patent: Aug. 5, 2014

(54) SYSTEMS AND METHODS FOR EXCHANGING RUNTIME FUNCTIONALITIES BETWEEN SOFTWARE STACKS

(75) Inventors: Vanish Talwar, Palo Alto, CA (US); Parthasarthy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2107 days.

(21) Appl. No.: 11/888,349

(22) Filed: Jul. 31, 2007

(51) Int. Cl.
*G06F 9/46* (2006.01)
*G06F 3/00* (2006.01)

(52) U.S. Cl.
USPC .................. 718/100; 718/102; 710/6

(58) Field of Classification Search
None
See application file for complete search history.

(56) References Cited

U.S. PATENT DOCUMENTS

| | | | |
|---|---|---|---|
| 5,619,726 A | 4/1997 | Seconi | |
| 7,334,086 B2 | 2/2008 | Hass | |
| 7,424,711 B2 | 9/2008 | Schluessler | |
| 7,694,159 B2 | 4/2010 | Cepulis | |
| 7,702,966 B2 | 4/2010 | Chandwani | |
| 7,757,023 B1 | 7/2010 | Ranganathan | |
| 7,805,734 B2 | 9/2010 | McKinley | |
| 8,176,168 B1 * | 5/2012 | Ramamurthy | 709/224 |
| 8,185,913 B1 | 5/2012 | Talwar | |
| 2004/0255055 A1 * | 12/2004 | Lamberts | 710/5 |
| 2005/0160423 A1 | 7/2005 | Bantz | |
| 2006/0095551 A1 * | 5/2006 | Leung et al. | 709/223 |
| 2006/0107311 A1 | 5/2006 | Dawson | |
| 2006/0130060 A1 * | 6/2006 | Anderson et al. | 718/1 |
| 2006/0184942 A1 * | 8/2006 | Cox | 718/100 |
| 2006/0271931 A1 * | 11/2006 | Harris et al. | 718/1 |
| 2007/0011491 A1 * | 1/2007 | Govindarajan et al. | 714/27 |
| 2007/0067769 A1 * | 3/2007 | Geisinger | 718/1 |
| 2007/0104452 A1 | 5/2007 | Wang | |
| 2007/0198750 A1 * | 8/2007 | Moilanen | 710/6 |
| 2008/0005748 A1 * | 1/2008 | Mathew et al. | 719/318 |
| 2008/0104591 A1 * | 5/2008 | McCrory et al. | 718/1 |
| 2008/0104601 A1 * | 5/2008 | Kaneko et al. | 718/103 |
| 2008/0126581 A1 * | 5/2008 | Komikado et al. | 710/5 |
| 2008/0154985 A1 | 6/2008 | Childs | |
| 2008/0222309 A1 * | 9/2008 | Shanbhogue | 709/250 |
| 2008/0222311 A1 * | 9/2008 | Lee et al. | 710/6 |
| 2008/0250222 A1 * | 10/2008 | Gokhale et al. | 711/203 |

OTHER PUBLICATIONS

Office Actions of File History of U.S. Appl. No. 11/888,348, dated May 24, 2010 and Nov. 9, 2009 (23 pages).
Office Actions of File History of U.S. Appl. No. 11/888,343, dated Jan. 25, 2012, Jun. 9, 2011, and Dec. 21, 2010 (58 pages).

* cited by examiner

*Primary Examiner* — Meng An
*Assistant Examiner* — Tammy Lee

(57) ABSTRACT

A system architecture that provides an exchange of runtime functionalities, the system architecture includes a first computing element operating to execute a first software stack to operate a first system; and a second computing element operating to execute a second software stack to operate a second system; wherein the first and second software stacks are configured to couple to each other at one or more data layers in the first and second software stacks to exchange functionalities between the first and second software stacks.

12 Claims, 7 Drawing Sheets

FIG. 1

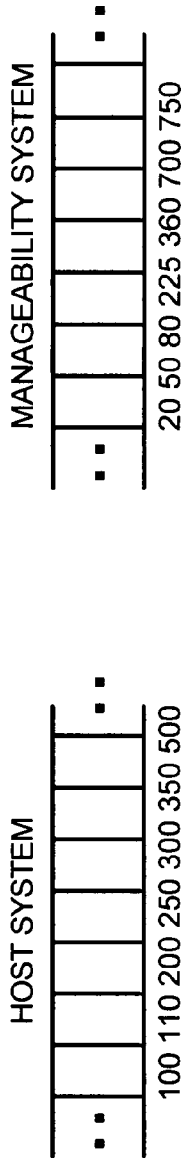

SYSTEMS AND METHODS FOR EXCHANGING RUNTIME FUNCTIONALITIES BETWEEN SOFTWARE STACKS

RELATED APPLICATIONS

This application is related to U.S. patent application Ser. No. 11/888,343, filed on Jul. 31, 2007, and entitled, "MANAGEABILITY PLATFORM IN AN UNIFIED SYSTEM, now U.S. Pat. No. 8,185,913 and U.S. patent application Ser. No. 11/888,348, filed on Jul. 31, 2007, and entitled, "STORAGE-CENTRIC MANAGEABILITY IN A SYSTEM", now U.S. Pat. No. 7,757,023, which are herein incorporated by reference in their entireties.

BACKGROUND

Manageability is a key requirement for a broad spectrum of information technology (IT) systems ranging from laptops to blade servers to clusters to large scale data centers. With rising complexity and scale in tomorrow's enterprise IT, system manageability has become a dominating cost. As referred herein, manageability includes management and maintenance tasks or operations that deal with bringing up, maintaining, tuning, and retiring a system. Also referred herein, and as understood in the art, information technology, or IT, encompasses all forms of technology, including but not limited to the design, development, installation, and implementation of hardware and software information or computing systems and software tasks, used to create, store, exchange and utilize information in its various forms including but not limited to business data, conversations, still images, motion pictures and multimedia presentations technology and with the design, development, installation, and implementation of information systems and tasks. Thus, examples of IT management and maintenance tasks or operations include diagnostics and recovery, security protection, backups, resource provisioning, and asset management of IT systems.

At a broader level, the scope of IT manageability may be associated with the lifecycle phases for servers and data centers, including bring up, operation, failures/changes, and retire/shutdown phases. Various manageability tasks are performed at each of these life cycle stages. Examples include provisioning and installation of servers, monitoring performance and health of systems, security protection against viruses and spyware, backup protection against disasters, disk maintenance to improve performance, fault diagnostics and recovery, and asset management to track resources. Several efforts are underway to address this growing problem of manageability. For example, software based solutions have been proposed to address manageability at the different lifecycle phases. In such solutions, several of the manageability tasks execute during the operation phase of the servers, sharing hardware and software resources with host applications. This sharing leads to resource interference and hence degradation in performance. Such degradation is expected to worsen with growing IT complexity and corresponding increases in the growing number and sophistication of manageability tasks.

One approach to addressing the above concerns is to provide better platform support for manageability tasks. An emerging trend towards this direction is the use of manageability processors (MPs)—dedicated hardware processors that only execute manageability tasks and provide an out-of-band channel for remote management. A typical MP is a small embedded application-specific integrated circuit (ASIC) customized for specific manageability uses or operations. It can be hooked off, for example, the peripheral component interconnect (PCI) bus at an input/output (I/O) bus (e.g., the southbridge) of computerized systems such as servers and personal computers (PCs). Instantiations of such MP architectures or platforms follow an asymmetrical model. The host system includes a powerful processor or central processing unit (CPU), large memory, network interface cards or modules (NIC), a server operating system (OS), while the manageability system typically includes a cheaper embedded processor, a small dedicated memory, NIC, and a private embedded OS that executes independently of the host system. Such asymmetry and independence aids in removing resource interference for processors, buses, caches, and memory, thereby resulting in improved performance for host workloads that are CPU and memory bound.

Thus, it would be beneficial to provide a platform support for manageability tasks that seamlessly interact with a host system for which the manageability tasks are performed.

BRIEF DESCRIPTION OF THE DRAWINGS

Embodiments are illustrated by way of example and not limited in the following figure(s), in which like numerals indicate like elements, in which:

FIG. 1 illustrates a system architecture having multiple software architectures therein, in which an embodiment for couplings may be practiced. in accordance with one embodiment.

FIGS. 6A-D illustrates an example for block I/O coupling, in accordance with one embodiment.

DETAILED DESCRIPTION

Figure 2:
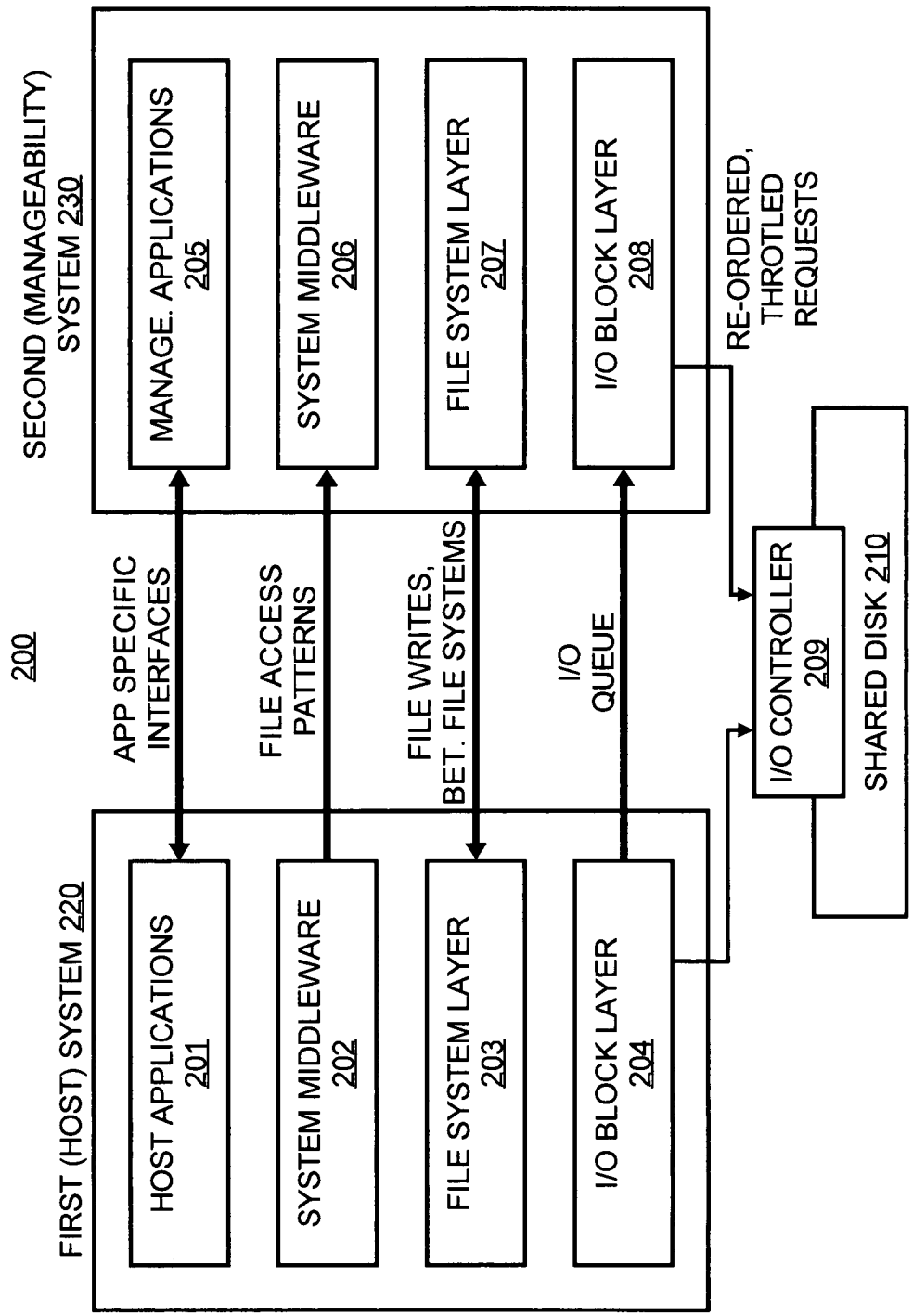
FIG. 2 illustrates a software architecture implemented in the system architecture 100 that provides couplings between the host and manageability systems and at multiple levels, including at the OS kernel and system middleware components.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

U.S. patent application Ser. No. 11/888,343, now U.S. Pat. No. 8,185,913 and U.S. patent application Ser. No. 11/888, 348, now U.S. Pat. No. 7,757,023 provide various embodiments for using a dedicated computing element, such as a manageability processor, that may be a part of a dedicated manageability platform for handling manageability tasks that are delegated away from a host system. Such delegation of system manageability provides several benefits.

First, such delegation improves host application performance. Delegating the manageability applications to a separate processing element eliminates resource contention and interference at all higher levels of the system, including at the thread level, at the shared caches' level, and at the memory bus level. Furthermore, having a separate OS stack for such a processing element also eliminates software level contention. This allows for a more powerful policy engine, such as the policy system 809, that enables more intelligent arbitration between the host applications and manageability applications to improve performance.

Second, delegating the manageability applications improves host power efficiency in certain cases. For example, compared to the host processor, the delegated separate computing element may be smaller, and consequently, the system architecture embodiments as described herein are likely to be more power efficient compared to traditional approaches. Isolating the two applications also provide greater opportunity for dynamic power control techniques like voltage and frequency scaling.

Third, delegating the manageability applications away from the host system enable separation of the manageability and host application domains for control and security. As discussed earlier, administrators often prefer additional control on manageability applications to have stricter controls on disabling or changing parameters. (For example, disabling virus scanning by a system user to improve performance might be disastrous.) From a fault-tolerance perspective, again, having separate hardware fault domains for the manageability and host processing provides valuable benefits, such as isolating failures due to software errors, hardware errors, security attacks so that these failure do not spread from one domain to another.

Fourth, delegating the manageability applications away from the host system enables use of an out-of-band power domain for manageability in certain cases so that system manageability may be performed while the host system is set to a power standby or off state to conserve power.

Fifth, delegating the manageability applications away from the host system enables portability of the manageability functionality. For example, it may be desirable to have a common manageability solution across different kinds of systems.

Sixth, from the perspective of a manageability application, delegating the manageability applications to a delegated computing element away from the host system also provide several benefits. For example, given its own local processing, many manageability tasks may be run 24×7 in the background all the time without having to deal with issues around resource contention. For applications like security or data integrity, this can be an important issue. Also, the proximity of the delegated computing element to the storage subsystem may potentially reduce the I/O latency, further improving the manageability performance.

Accordingly, the decoupled software architecture, as provided by having two separate operating systems to run on the host system and the manageability platform, eliminates contention for resources such as those of processors, hardware caches, and memory bus. Eliminating such hardware contention does provide improved performance for CPU and memory bound host applications when executed in parallel with manageability applications.

Several manageability tasks or workloads rely on the data from the host system for its operations and may generate I/O contention at the shared disk with the host application workload. Examples include backup, anti-virus scan, disk auditing, disk indexing. This I/O contention, in turn, may affect the I/O path performance. Two major factors in the I/O path performance are disk seek times and the buffer cache hit rates. In a single OS image environment, the OS maintains an I/O queue where requests from multiple processes are sorted and maintained in an order such that disk seek times are reduced. A large body of work has gone into the design of such algorithms and software stacks which have helped improve performance of applications drastically. However, in manageability system frameworks with multiple independent and private OS images, multiple such I/O queues are being maintained for the shared data storage area in the host system, such as a shared disk drive. Each of these OS'es schedule the I/O blocks from their own private queue with no information about the I/O block access patterns at the other processor. Because the disk is still shared, this results in the I/O controller and disk to effectively receive an unsorted and at times random order of I/O requests that result in very poor disk seek performance due to back and forth movement of the disk head.

The OS also maintains a buffer cache that caches disk contents for better performance. Existing manageability architectures maintain separate buffer caches in their own private OS images. Maintaining separate private buffer caches at the host and manageability systems helps prevent unwanted cache eviction for host workloads. However, where the disk blocks overlap, the two systems would now miss the advantage of mutual cache hits. Finally, maintaining separate file system stacks in multiple OS images lead to consistency issues. As mentioned above, the OS maintains a buffer cache and if pages are dirty in multiple buffer caches, there is a huge file consistency problem in such decoupled software architectures.

Accordingly, it is desirable to eliminate the above possible contention for shared input/output (I/O) to a data storage area, such as shared disk drive.

Described herein are systems and methods for coupling OS pairs in a system framework or architecture that exhibits a decoupled software architecture therein, such as a manageability system framework with multiple independent and private OS'es, so as to minimize or eliminate I/O contention for shared data storage space, such as a shared disk drive.

Figure 1:
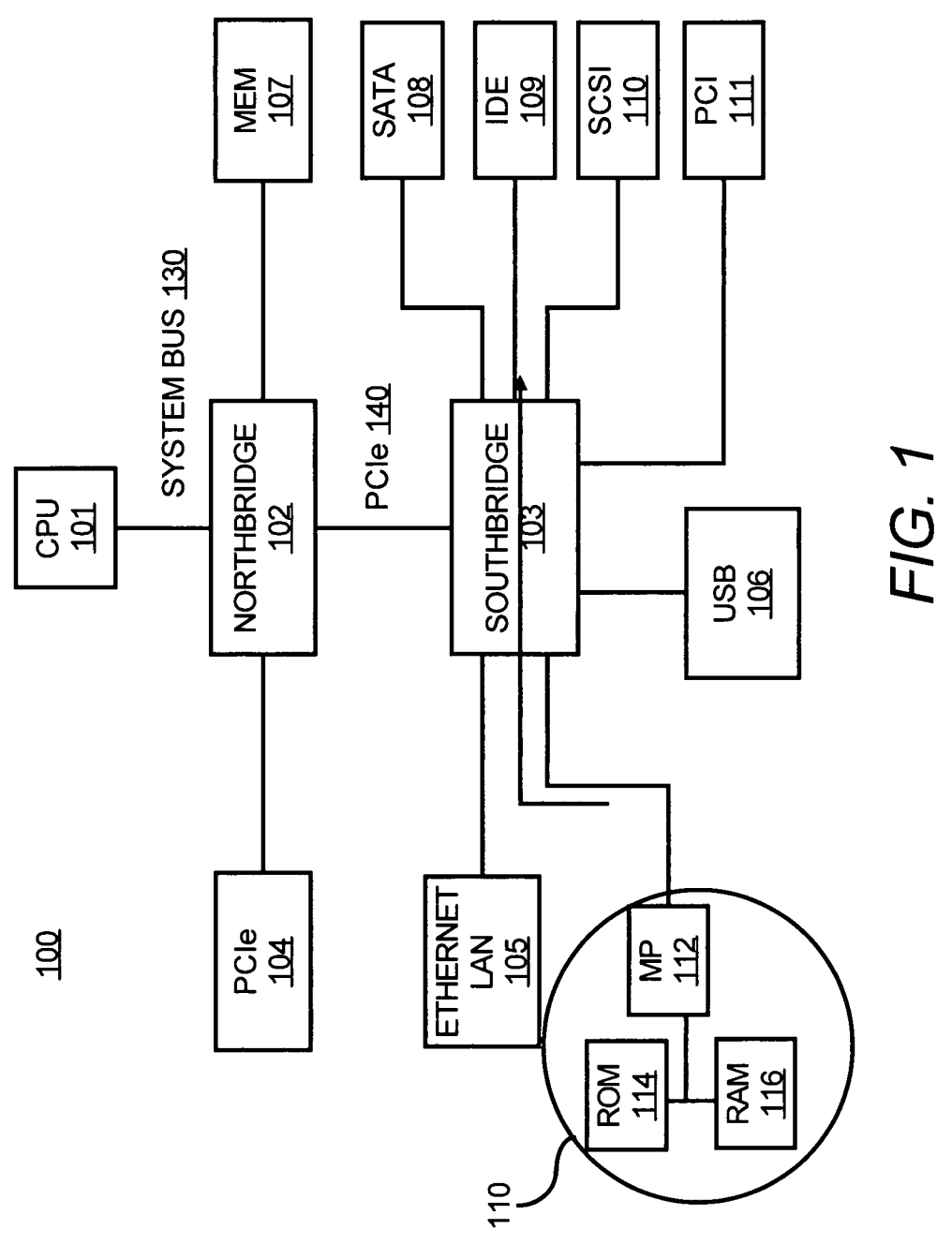

FIG. 1 illustrates a system architecture 100 having multiple software architectures therein, in which an embodiment for software-architecture coupling may be practiced. In one example, the system architecture 100 is of a host computer system, such as a personal computer, a server, or a mainframe, that delegates manageability tasks to a delegated point that includes a processing element 112 separate from the host CPU 101. Although only one CPU is illustrated, it should be understood that the host system may include a single-core CPU, a homogeneous multi-core CPU or processor (where the cores are the same), a heterogeneous multi-core CPU or processor (where the cores are different) or a multi-socket CPU configuration that includes multiple CPUs operating therein. In one embodiment, the delegated point for manageability tasks is a processing system such as a manageability platform or system 110 that is integrated in the host system at the southbridge 103. Although discussions herein are made with reference to northbridge and southbridge as examples, it should be understood that such discussions are applicable to any memory controller hub in place of the northbridge 102 and a I/O hub (IOH) or any I/O controller hub in place of the southbridge 103. Because the manageability platform 110 is separate from the rest of the host system, it is possible to provide an out-of-band power domain for the manageability platform 110 that is separate from the power domain for the rest of the host system.

From a hardware perspective, the processing system such as the manageability system 110 includes a processing element 112 with supporting read only memory (ROM) 114 and RAM 116. In one embodiment, the processing element 112 is a general-purpose processor of any of a number of computer processors, such as processors from Intel, AMD, and Cyrix, that is operable to execute a myriad of manageability tasks instead of the typical task specific integrated circuits (ASICs) that are currently used in some computer systems for limited manageability functions. Thus, in one example, the processing element 112 is a manageability processor (MP) dedicated to executing manageability tasks in the host system, freeing up the main or host CPU 101 to execute host system tasks with higher performance. However, alternative examples are contemplated wherein the MP is a processor in a multi-processor host system, a core in a multi-core processor implemented in the host system, an enhanced computer processor implemented in a disk controller for a data storage area in the host system.

As illustrated in FIG. 1, the manageability system 110 and its MP 112 therein have control and data paths through the southbridge 103 to access the data storage area of the host system. These paths may be separate or the same as the control and data paths used by the host CPU 101 to access the data storage area through the northbridge 102. When interfacing the MP 112 to a disk controller (108-110) in the data storage area, arbitration issues around concurrent disk accesses at the I/O controller, e.g., the southbridge 103, from the host system and manageability platform are addressed through use of disk controllers that support arbitration like SCSI and fiber channel controllers. Alternatively, for disk controllers that do not support such arbitration, it is possible to provide a virtualized disk abstraction in software in those disk controllers to support arbitration.

From a software perspective, the software model for the manageability system 110 includes two main components that may installed as firmware or software in the ROM 414 and resident in RAM 116 at runtime. The first component is a general software system that includes an embedded OS acting as core controller to host manageability software tasks and a set of standard software interfaces, such as those defined by Platform Management Components Interconnect (PMCI) Working Group of the Distributed Management Task Force (DMTF). The second component of the software model comprises the middleware that pertains to synchronization of information across the host and manageability environments and other application specific interfaces (APIs) between host applications 201 and manageability applications 205.

FIG. 2 illustrates a software architecture 200 implemented in the system architecture 100 that provides couplings at runtime between two software stacks 220 and 230, such as between the host and manageability software stacks, at multiple levels, including at the OS kernel and system middleware components. As referred herein, a software stack includes one or more software stacks and methods and algorithms that work with such software stacks. The couplings are designed to be extensible and with minimal changes at the host system or stack 220. As referred herein, runtime indicates a time duration in which the host system is powered up or otherwise in operation. It should be understood that the two software stacks may be OS stacks, hypervisor stacks for hosting virtual machines, or any other OS-like stacks for operating a device. The runtime coupling enables an exchange of functionalities between the two software stacks during runtime.

At the lowest layer, the block I/O layers 204 and 208 of the two systems are loosely coordinated. The I/O queues are exchanged between them, and the disk block requests (in the I/O queue) at the manageability system 230 are reordered periodically to follow that of the host system 220 for issuance to the I/O controller 209 to access the shared disk 210. Thus, the disk seek times are expected to improve. Next, at the file system levels or layers 203 and 207, the read/write consistency is coordinated for file system coupling. This is done by pre-selecting the host system 220 to be the sole master responsible for all writes in the overall system architecture 200. The manageability system 230 only performs reads and redirects all writes to the host system 220. In addition, the host system 220 is responsible for electing the type of file system to be used for the shared data. This is communicated to the manageability system 230 which follows the host system 220. It should be noted that the I/O block layer and the file system layer are parts of an OS.

In addition to the block I/O coordination or coupling, there is provided synchronization of file access patterns from the host system 220 to the management system 230 for file system access coupling. This is depicted at the system middleware layers 202 and 206, as illustrated in FIG. 2. This coordination informs the manageability tasks performed in the manageability system 230 to access the same files that the host system 220 is accessing to benefit from cache and disk seek benefits. Finally, at the application levels 201 and 205, there is coordination to obtain application specific information useful to the management task.

The block I/O, file system, and file system access couplings in an execution flow of the overall system architecture 200 are provided through daemons at the host system 220 and the manageability system 230. During system startup, a daemon at the host system 220 provides the information regarding the file system type of the shared disk (108-110, FIG. 1) (or the shared partition of the disk) to the daemon at the manageability system 230. The management system 230 accordingly selects the appropriate file system to use and mounts it from the disk. Thereafter, during the system operation phase, three actions take place periodically. First, the daemon at the host system 220 provides a dump of the block I/O queue to the manageability system 230. This dump is provided to the host daemon from kernel space and the daemon at the manageability system 230 provides the dump from user space to its kernel space. In this way, the block I/O layers 204, 208 at the two systems coordinate with each other with the aid of user space daemons. Once the dump is in the block I/O layer 208 at the manageability system 230, the latter would attempt to either reorder the requests in its I/O queue or throttle (i.e., delay) the requests based on the level of match between the two I/O queues. Second, the host daemon periodically supplies the list of open files at its system 220 to the manageability daemon. Manageability tasks such as those for a virus application then reorder their scan list to follow the file access pattern of the host system. Third, any attempts to do writes to the shared file system at the manageability system 230 is intercepted and provided by the manageability daemon to the host daemon. Optionally, there is additional coordination provided at the CPU scheduling level and for manageability task applications.

Figure 3:
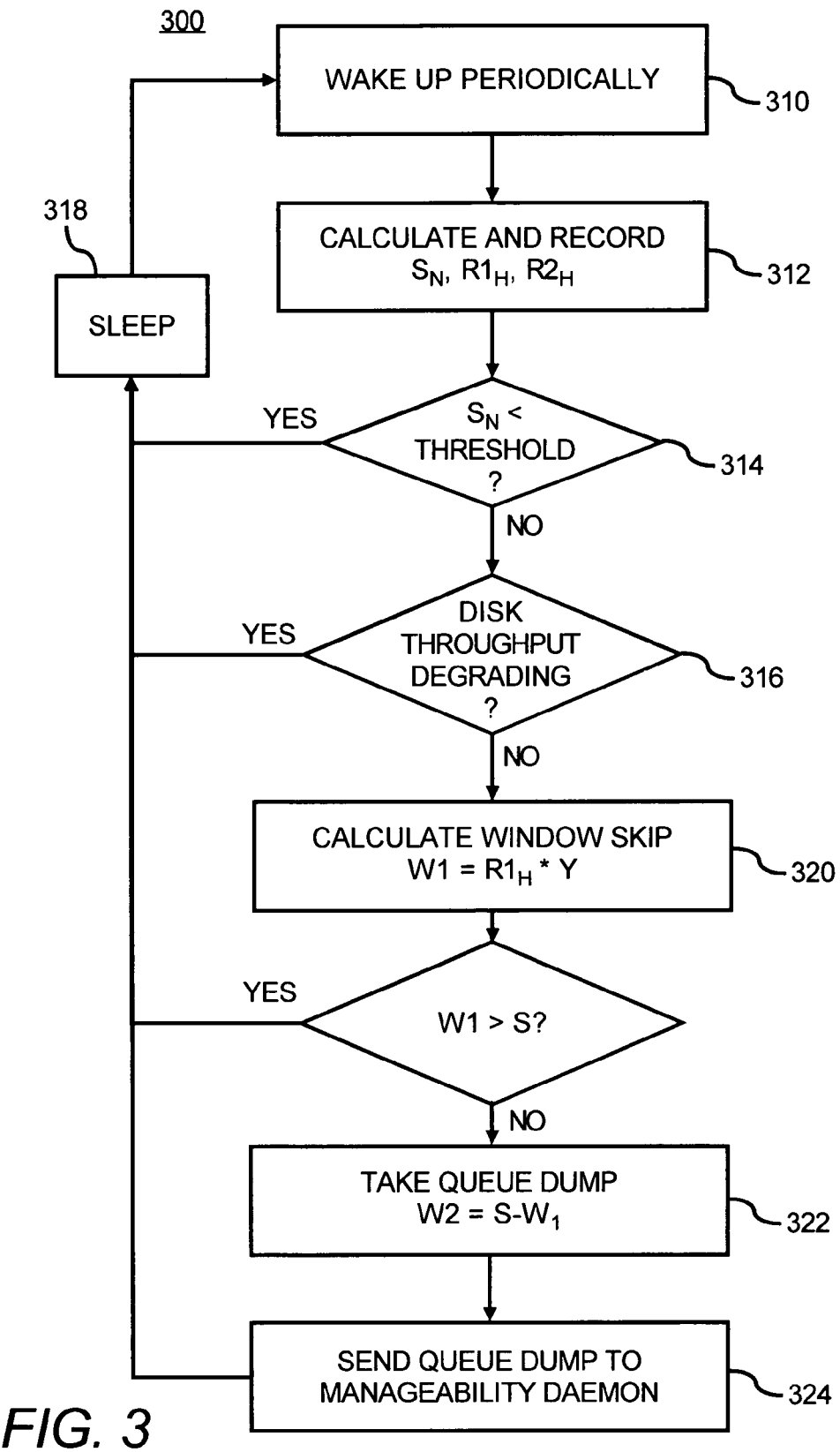
FIG. 3 illustrates a method for block I/O coupling at a host system, in accordance with one embodiment.

There are two key components of block I/O coupling. One is at the host system 220 with regards to creating a dump of the I/O queue. The other is at the manageability system 230 with regard to reordering its block I/O queue given periodic dumps from the host system 220. FIG. 3 illustrates a method 300 for the first component of block I/O coupling, that is, block I/O coupling at the host system 220, in accordance with one embodiment. Table 1 shows the notation used. For illustrative purposes and not to be limiting thereof, FIG. 3 is described in the context of the software architecture 200. Thus, the method 300 may be implemented by a host daemon, which may be a software program stored in a CRM of the host system 220.

The method 300 implements a windowing mechanism to obtain a snapshot of the I/O queue as seen appropriate for coordination by the I/O scheduler (not shown) in the host OS. This is done periodically, for example, every t seconds, with the waking up or activation of the host daemon (at 310). The I/O queue may be looked upon as containing a continuous stream of I/O requests that are issued to the block I/O layer 204 and emptied by the block drivers. Accordingly, a window slice refers to capturing a set of I/O requests in a time window that has sufficient I/O activity via use of a threshold (at 312, 314). To provide adaptiveness to the method 300, throughput of the shared data storage area, for example, the shared disk 210, is also periodically checked to see if it is degraded due to the execution of the software programming for the method 300 (at 316). The key idea of the method 300 is to obtain a window slice that will last long enough in the host kernel to finish the coordination; otherwise, the requests may be already issued at the host system to the disk before the manageability system 230 finishes its coordination and nullifies any benefits (at 320-322). Once the window slice is obtained, it is captured in an appropriate format and sent to the manageability system 220 and its daemon (324), and the host daemon goes back to sleep (318).

TABLE 1

| Symbol | Description |
| --- | --- |
| $S_N$ | Average size of queue in the last N rounds |
| S | Size of queue in current round |
| $R1_x$ | Rate of requests issued to the driver (x is M for manageability system and H for host system) |
| $R2_x$ | Rate of requests entering the I/O queue |
| W1 | The window representing entries to be skipped in the queue dump (because communication time is too much to provide any benefits. |
| W2 | The window representing entries to be considered in the queue dump |
| y | The communication time to interface to the manageability system |

Figure 4:
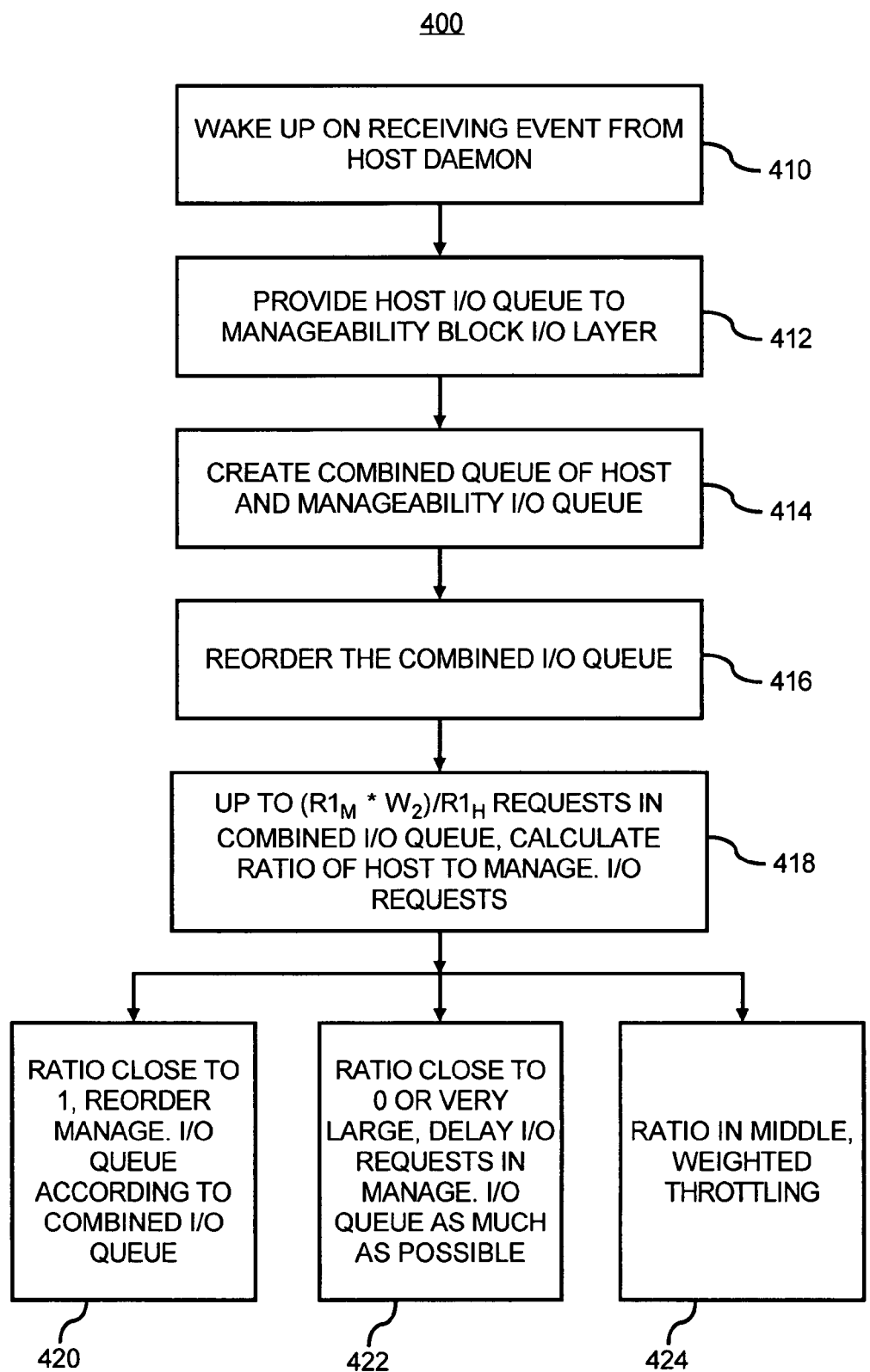
FIG. 4 illustrates a method for block I/O coupling at a manageability system, in accordance with one embodiment.

FIG. 4 illustrates a method 400 for the second component of block I/O coupling, that is, block I/O coupling at the manageability system 230, in accordance with one embodiment. Table 1 shows the notation used. Again, for illustrative purposes and not to be limiting thereof, FIG. 4 is described in the context of the software architecture 200. Thus, the method 400 may be implemented by a manageability daemon, which may be a software program stored in a CRM of the host system 220.

The method 400 begins with the manageability daemon waking up or activated 410 upon receiving an event such as a dump of the host I/O queue (at 410). Once the dump is received at the block I/O layer 208 of the manageability system 230, the manageability system OS applies a reordering strategy for its own I/O queue. The reordering subsystem maintains an internal queue that combines the queue requests from the host and the manageability system (at 414) such that the requests from the manageability system follow that of the host system. This is illustrated by an example in FIGS. 6A-D. In this example, a list of requests from the host and manageability systems over time are shown in FIG. 6A. Conventionally, these two sets of requests are typically issued independently, which could result in increasing the disk seek latency and degradation of I/O path performance. FIG. 6B illustrates a possible order in which disk seeks conventionally could happen. FIG. 6C illustrates the ideal order in which disk seek (I/O) requests to be executed, for example, if there was a single OS instance in the system 200. FIG. 6D illustrates the order in accordance with block I/O coupling described in methods 300 and 400. The reordering subsystem first creates a combined queue containing requests from the host and manageability system I/O queues (at 414). To create the ordering for this combined queue, it tries to find requests from the manageability system I/O queue that can take advantage of the provided request ordering of the host system I/O queue by applying an algorithm such as an elevator algorithm to put the combined I/O queue in a sorted order (at 416). For example, in FIG. 6D, requests 20,50,80 of the manageability I/O queue are completely out of sync with the current host request order. However, requests 225 and 360 can fit in with the host requests and seeking these blocks in tandem with the host request blocks can provide better seek times. I/O requests 700 and 800 on the other hand do not overlap with existing host requests but can be added at the end of the combined queue because they are in the same ascending order of requests of the host I/O queue. Requests 20,50,80 are finally added at the end of the combined queue.

Given such a combined queue, the reorder subsystem in the manageability system 230 subsequently picks a certain threshold percentage of the queue, for example, 80% of the queue and calculates the ratio of host and manageability requests (at 418). If the ratio is very large, it implies there is not much overlap between the host and manageability I/O requests, in which case the strategy is to not reorder the manageability queue but rather throttle, i.e., delay, the manageability requests as much as possible (422). Throttling helps delay the manageability requests and thus potentially prevents the manageability system to thrash the host requests. If the host queue is very small leading to the ratio being close to 0, again it may not be worthwhile or needed to do any reordering, and in this case the manageability system may keep issuing I/O requests which are then delayed as much as possible (422). If the ratio is close to 1, then there is a case for reordering (at 420). In this case, the reorder subsystem removes the host system I/O requests from the combined queue and the residual queue becomes the manageability I/O queue as illustrated in FIG. 6D. In all other cases, weighted throttling is done along with reordering (at 424).

The file system coupling is provided for two functions. First, during the boot phase, the manageability system 230 requests the host system 220 to provide information about the file system type for the shared disk. Second, during the operation phase, the host and manageability systems coordinate to maintain file system consistency on the shared disk 210. To support the first function, the manageability system 230 is designed to have support for multiple file systems in the manageability kernel. For example, OS'es such as Linux provide such support and may be leverage in the design of the system 230. Given support for such heterogeneous file systems, the file system coupling design is as follows. A stub at the host OS in the host system 220 provides knowledge of the host file system type to the manageability system 230. This information is then used by the MP to choose the appropriate file system modules and the corresponding host file system is mounted at the manageability system.

To support the second function for the file system coupling, the host system 220 is set as the master and the sole entity responsible for all file system writes; whereas, the manageability system 230 mounts the file system read-only. For writes, the failed writes are intercepted and redirected to the host system. The host system 230 executes the writes. In this way, file consistency is maintained. If a host application performs any writes that are not written to disk while the manageability application has started, the writes will not be reflected at the manageability system 230. However, the next time the manageability application runs, those writes would be visible and hence they would be eventually considered by it.

As shown in FIG. 2, at the system middleware layers 202 and 206, for file system access coupling, the file system access patterns at the host system 220 may be provided to the manageability system 230 to take advantage of cache locality and to produce block I/O requests that overlap with each other. The potential use of such information is best illustrated through an example. A virus scan application in the manageability system 230 normally does its scan by going through the entire namespace of the provided file system. For file system access coupling, the available file access pattern at the host system 220 is employed to re-order the scan so that the virus application gives higher priority to scan files that are already being open at the host system 230.

Figure 5A:
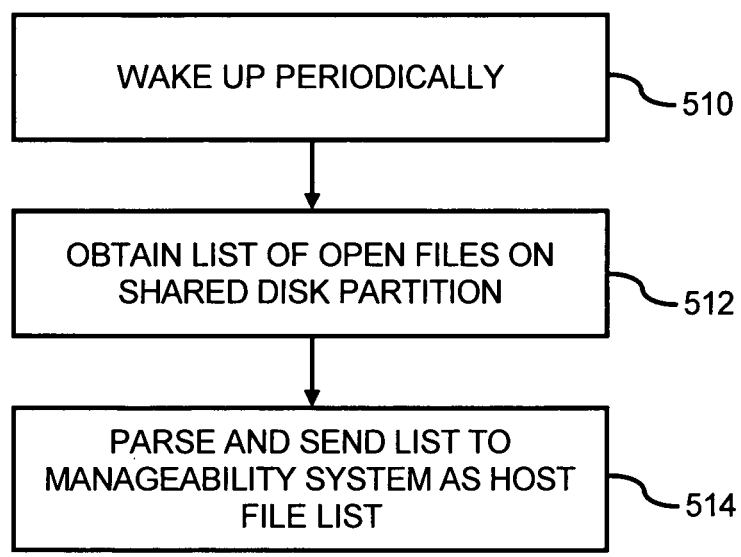
FIGS. 5A-B illustrate methods for file system access coupling at the host and manageability systems, respectively, in accordance with one embodiment.
Figure 5B:
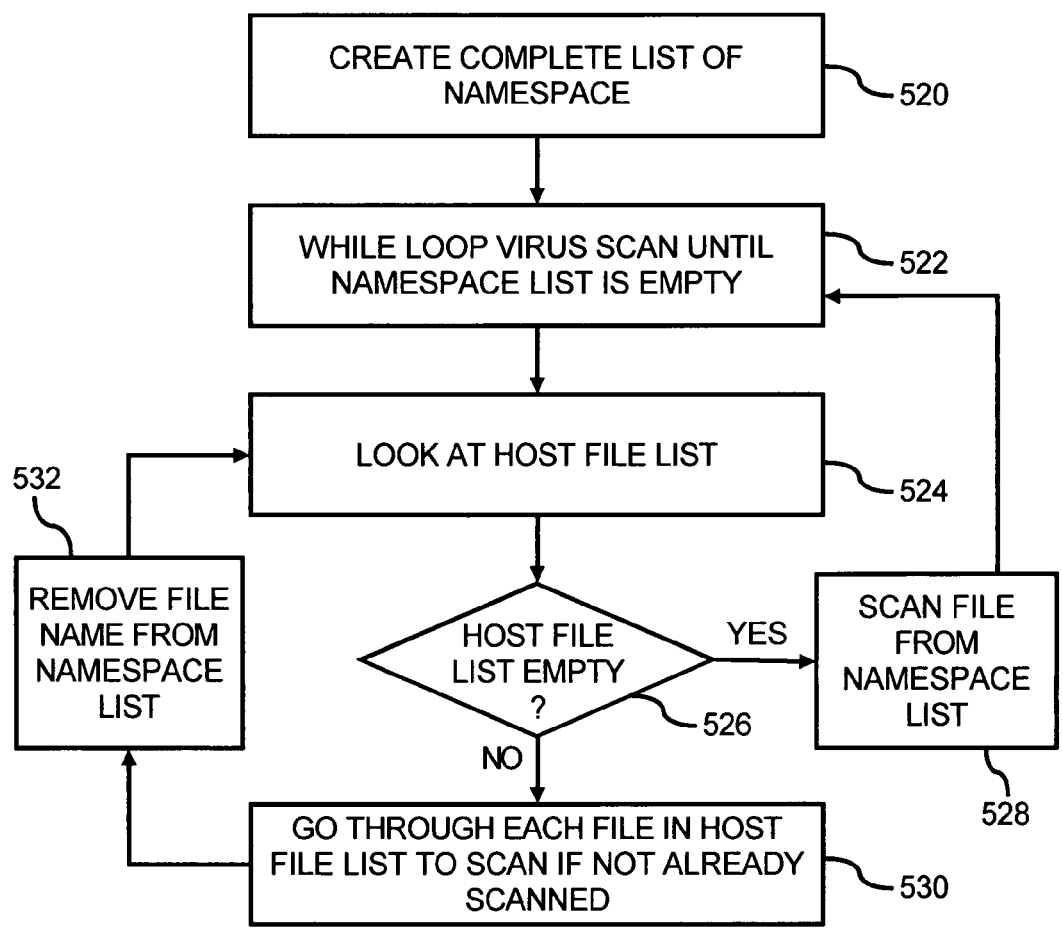

FIGS. 5A-B illustrate methods 500A and 500B for file system access coupling at the host system 220 and manageability system 230, respectively. Again, for illustrative purposes and not to be limiting thereof, FIG. 6 is described in the context of the software architecture 200. Thus, the method 400 may be implemented by a manageability daemon, which may be a software program stored in a CRM of the host system 220. The basic idea is to maintain two file lists at the manageability system 220. One is the list based on the namespace scan of the shared disk 210 to be scanned (at 520). The other is the list of open files (host file list) at the host system 230 that is provided by the host system 230. This latter information is provided by the host daemon (at 510-514). Through a continuous loop until the namespace list is empty (at 522 and 532), the virus scan first looks at files in the host file list (at 524) to scan (at 530), and if empty or if already scanned (at 526), then proceeds to normal scan of the namespace (at 528).

At the application layers 201 and 205, management task coupling is provided. For example, a system monitoring solution in many scenarios split across the host and proposed manageability system. Examples of monitoring applications at the host system are those for collecting application health and performance information, as well as OS level logging information. Monitoring applications at the manageability system include those for collecting power and disk activity information. The monitoring data collected by these monitoring applications are exchanged across the host and manageability systems using closely coupled interfaces. In another example, a system asset management solution includes inventory information related to applications and OS/VMs running on the host system are sent via closely coupled interfaces to the manageability system. In still another example, monitoring information collected at the host system is exchanged to the manageability system where a diagnostics engine analyzes the data. Subsequently, policy decisions made by the diagnostics/analysis engine are exchanged to the host system for actuation. Such exchange of information across the host & manageability system take place through closely coupled interfaces.

Additional heuristics related to CPU scheduling that may be considered for improving system performance. For example, the host daemon may provide periodic information of the CPU activity at the host system 220. If the host system is very heavily loaded, then it may be inferred that there is a potential that I/O requests are also being issued. Consequently, the manageability system 230 may decide to perform throttling and slow down its rate of requests. Also, management task specific coupling may be considered either for performance reasons or for better design functionality.

In recap, the systems and methods as described herein provide closed-coupling of operating system pairs and middleware stacks of two systems so as to better provide coordination between two software architectures when managing shared resources.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A system architecture comprising:
    a data storage medium;
    a host system comprising a host operating system (OS) and a first computing element including a first processor to receive a first set of host Input/Output (I/O) requests in the host system, the first computing element to execute a host system task within the host OS; and
    a manageability system comprising a manageability OS and a second computing element including a second processor to receive a second set of manageability I/O requests in the manageability system, the second computing element to execute a manageability task that is delegated away from the host system, wherein the manageability task is executed within the manageability OS,
    wherein the host OS includes a host I/O scheduler to provide the first set of host I/O requests, for accessing the data storage medium, to the manageability OS, wherein the manageability OS includes a manageability I/O scheduler to set up the second set of manageability I/O requests for accessing the data storage medium and to repeatedly reorder the second set of manageability I/O requests based on the first set of host I/O requests provided by the host I/O scheduler.

2. The system architecture of claim 1, wherein:
    the host system includes a first hypervisor configured to host one or more virtual machines, and the manageability system includes a second hypervisor configured to host one or more virtual machines.

3. The system architecture of claim 1, wherein the first processor is one of a homogeneous multi-core processor, a heterogeneous multi-core processor, a multi-socket element that includes a plurality of processors, and a single-core processor.

4. The system architecture of claim 1, wherein the manageability OS is configured to perform read operations to access the data storage medium and to redirect write operations to the data storage medium to the host OS for performance thereof.

5. The system architecture of claim 4, wherein the write operations redirected by the manageability OS are operations for the manageability task.

6. The system architecture of claim 1, wherein the host and manageability systems each includes an application layer to exchange data associated with the manageability task to provide one of a monitoring of a health of the host system, an asset management of the host system, and a closed loop control of the host system.

7. A system architecture comprising:
    a data storage medium;
    a host system comprising:

a first computing element including a first processor to receive a first set of Input/Output (I/O) requests in the host system, a host operating system (OS), and a host middleware that logically resides between the host OS and an application in the host system, the first computing element to execute a host system task within the host OS; and a manageability system comprising:

a second computing element including a second processor to receive a second set of I/O requests in the manageability system, a manageability OS, and a manageability middleware that logically resides between the manageability OS and an application in the manageability system, the second computing element to execute a manageability task that is delegated away from the host system, wherein the manageability task is executed within the manageability OS;

wherein the second computing element is to reorder the second set of I/O requests based on the first set of I/O requests;

the host middleware is to inform the manageability middleware of at least one data file in the data storage medium that the host middleware accesses; and the manageability middleware is to synchronize with the host middleware so as to concurrently access the at least one data file being accessed by the host middleware.

8. The system architecture of claim 7, wherein the first and second processors are general-purpose computer processors in a multi-processor computer machine that houses the host system and the manageability system.

9. A method, comprising:

receiving, in a host system including a host OS, a first set of I/O requests for accessing a shared storage medium to be executed by a first computing element including a first processor, wherein the first computing element executes a host system task within the host OS;

receiving, in a manageability system including a manageability OS, a second set of I/O requests for accessing the shared storage medium to be executed by a second computing element including a second processor, wherein the second computing element executes a manageability task within the manageability OS, and wherein the second set of I/O requests is independent of the first set of I/O requests; and reordering the second set of I/O requests based on the first set of I/O requests, wherein the host OS includes a host I/O scheduler to provide the first set of I/O requests to the manageability OS, wherein the manageability OS includes a manageability I/O scheduler to set up the second set of I/O requests for accessing the data storage medium and to repeatedly reorder the second set of I/O requests based on the first set of I/O requests provided by the host I/O scheduler.

10. The method of claim 9, wherein the first set of I/O requests and the second set of I/O requests are directed to accessing the shared storage medium coupled to the first computing element and the second computing element.

11. The method of claim 9 further comprising:

combining the first set of I/O requests and the second set of I/O requests into a combined queue; and reordering the combined queue based on the first set of I/O requests.

12. A non-transitory computer-readable storage medium storing instructions that upon execution cause an arrangement including a host system and a manageability system to:

receive, in the host system including a host OS, a first set of I/O requests for accessing a shared storage medium to be executed by a first computing element including a first processor, wherein the first computing element executes a host system task within the host OS;

receive, in the manageability system including a manageability OS, a second set of I/O requests for accessing the shared storage medium to be executed by a second computing element including a second processor, wherein the second computing element executes a manageability task within the manageability OS, and wherein the second set of I/O requests is independent of the first set of I/O requests; and reorder the second set of I/O requests based on the first set of I/O requests, wherein the host OS includes a host I/O scheduler to provide the first set of I/O requests to the manageability OS, wherein the manageability OS includes a manageability I/O scheduler to set up the second set of I/O requests for accessing the data storage medium and to repeatedly reorder the second set of I/O requests based on the first set of I/O requests provided by the host I/O scheduler.

\* \* \* \* \*